United States Patent [19]

Attinger et al.

[11] Patent Number: 4,595,302
[45] Date of Patent: Jun. 17, 1986

[54] BEARING DEVICE FOR WHEEL AXLES

[75] Inventors: Urs Attinger, Riedt; Serge Lütschg, Zurich, both of Switzerland

[73] Assignee: Swiss Aluminium Ltd., Chippis, Switzerland

[21] Appl. No.: 658,551

[22] Filed: Oct. 9, 1984

[30] Foreign Application Priority Data

Oct. 17, 1983 [CH] Switzerland ............................ 5636/83

[51] Int. Cl.⁴ .............................................. F16C 25/08
[52] U.S. Cl. .................................... 384/558; 384/563; 384/582
[58] Field of Search ............... 384/447, 558, 582, 581, 384/563

[56] References Cited

U.S. PATENT DOCUMENTS

| 2,532,327 | 12/1950 | Parks | 384/581 |
| 3,431,035 | 3/1969 | Dangauthier | 384/532 |
| 3,476,454 | 11/1969 | Markey | 384/581 |
| 3,981,550 | 9/1976 | Zimmer et al. | 384/558 |

Primary Examiner—Lenard A. Footland
Attorney, Agent, or Firm—Bachman & LaPointe

[57] ABSTRACT

A bearing device for wheel axles, in particular for the axles of a railway car bogie, is such that a bearing housing encloses a wheel bearing comprising an inner ring fitted on the axle and an outer ring with rollers, balls or the like between the said rings, the inner ring being held securely in place by a nut screwed on to the said axle. Energy storage means, to accommodate forces acting on the wheel bearing in the operating position, are provided between the wheel bearing and the bearing housing.

15 Claims, 1 Drawing Figure

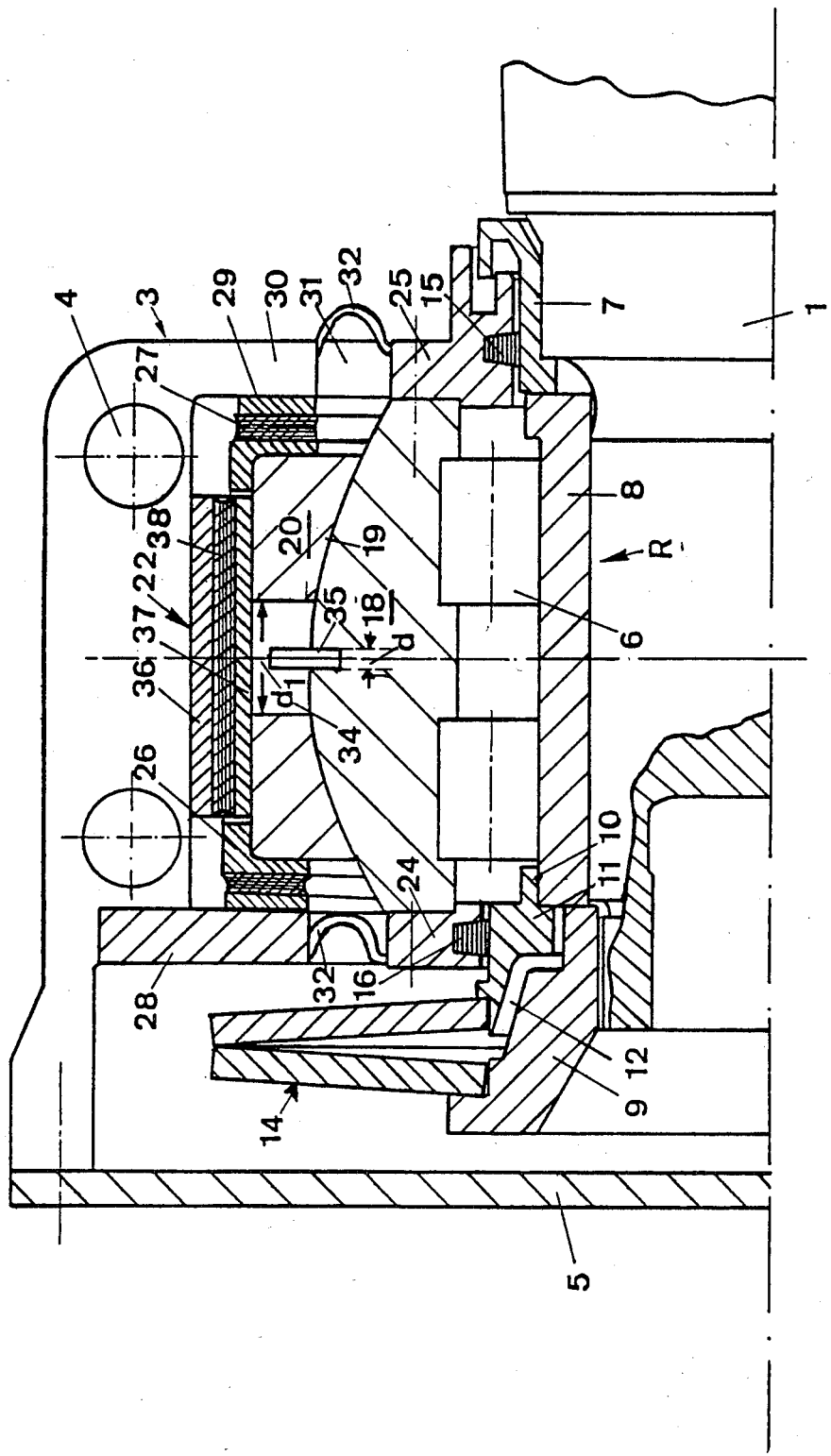

BEARING DEVICE FOR WHEEL AXLES

BACKGROUND OF THE INVENTION

The invention relates to a bearing device for wheel axles, in particular for the axles of a railway car bogie, having enclosed in a bearing housing a wheel bearing comprising an inner ring fitted on the axle and an outer ring aligned with and around the inner ring with rollers, balls or the like between the said ring, and with the inner ring held securely in place by a nut screwed onto the said axle.

Bearing devices for wheel axle shafts, in particular for axle shafts of railway vehicles, are known to be generally in the form of outer or inner bearings. Outer lying bearings are situated on the shaft outside the pair of wheels; inner bearings on the other hand are arranged on the shaft between the wheels. In their construction one differentiates in particular between sliding and roller or ball bearings. These have the function of transmitting the vertically acting weight of the part of the vehicle supported by the vehicle, the forces produced in the rails and acting in the transverse direction due to the steering of the vehicle, and the tensile and braking forces acting in the longitudinal direction.

These forces acting on the axle shaft bearing are normally transmitted to the shaft bearing housing without any springs to cushion the transmission. For the main bearing use is frequently made of cylindrical type roller bearings which roll on an inner ring running round the axle shaft and on an outer ring mounted fixed to the bearing housing. These conventional roller bearings do not permit any angular displacement between the axle bearing and the axle.

The object of the present invention is to develop a bearing device for wheel axles which provides a springing action to cushion the forces acting on the wheel bearing. Furthermore the said device should permit tilting between the axle and the axle bearing housing i.e. it should be possible to move the axle, with respect to the axle bearing housing, over a relatively large angle.

SUMMARY OF THE INVENTION

This object is achieved by way of the invention in that energy storage means are provided between the wheel bearing and the axle bearing housing and/or the end nut in order to accommodate forces acting on the wheel bearing in the operating position.

The energy storage means comprise a plate spring which is braced against the end nut and also against a support ring. This way it keeps the support ring a distance from the end nut. A shoulder on the support ring engages the inner ring and such that the contact surface on both rings are sliding bearing surfaces.

The interaction between inner ring, support ring, plate spring and end nut serves in particular to cushion axial running forces which act on the wheel bearing for example in curves as a result of centrifugal forces.

According to another improvement, which in particular concerns the provision of a tilting action between axle and bearing housing, the ring which is normally provided as the outer ring of the wheel bearing should be present as a middle or intermediate ring on which an additional outer ring resides. This outer ring braces itself, via the energy storage means, against the bearing housing or parts thereof.

In order to provide a tiltable form of bearing between the middle and outer rings, the contact surfaces on both rings are spherically domed. To limit the degree of movement of both rings with respect to each other and for securing purposes, pins project out of the spherical shaped surface of the middle ring and into holes in the outer ring, the diameter of the holes being larger than the diameter of the pins. This limits the amount of play between both rings as, after certain degree of tilt the pins press against the inner walls of the holes.

The above mentioned energy storage means of the outer ring are preferably in the form of elastic components, in particular rubber-like elements.

In a further, improved version of the invention a holding or securing ring should be flanged at one side of the middle ring and a counterlying ring at the other side. A ring-shaped opening is provided between the counter ring and part of the housing and also between the holding ring and sidewall ring, both of these openings being bridged by membranes. These membranes protect the bearing surface between the outer ring and the middle ring from dirt, and at the same time permit the desired movement of both rings. The counter ring is connected to the labyrinth ring and the holding ring to the support ring by felt rings or the like elastic, sealing rings or by virtue of their matching shapes. This means that these rings move cooperatively without making contact during the movement of the axle in the bearing.

Another way of achieving the set objective or improving the version described above is such that the vertical forces in particular are cushioned. This is achieved by way of the invention in that a spring-ring comprising two shells is pushed on to the middle ring. Energy storage means are inserted between these two shells at least at the vertical poles of the wheel bearing.

However, in order to cushion both the axial and the vertical forces, the above mentioned spring-ring should rest on the outer ring with its elastic workpieces and arragement with the plate spring.

According to the invention the energy storage means between the two shells of the spring ring comprises strips of elastic material on both sides fo the vertical pole. Simple rubber strips can serve this purpose. In the present case these exhibit a rigidity or compression range at a level of about 10 metric tons per millimeter. By means of these strips also the tensile and braking forces acting in the longitudinal direction are cushioned whereby, if desired or necessary, additional strips of elastic material can be inserted between both shells of the spring-ring also at the horizontal poles of the wheel bearing.

BRIEF DESCRIPTION OF THE DRAWING

Further advantages, features and details of the invention are revealed in the following description of a preferred exemplified embodiment and with the help of a drawing. The drawing shows one half of a partly sectioned axle bearing for railway vehicles.

DETAILED DESCRIPTION

In a bogie, especially such for railcars, two wheel set shafts, not shown here, are coupled together via longitudinal beams. Each of these wheel set shafts 1 runs in a wheel bearing R which is enclosed in a housing 3. The housing 3 usually comprises two bearing halves which are held securely together by means of threaded bolts, not shown here, in holes 4.

The wheel bearing R is covered over on the outside by a cover 5. The wheel itself, not shown here, is situated on the wheel axle shaft 1, on the side remote from lid 5.

The wheel shaft 1 runs on a roller bearing made up of cylindrical shaped rollers 6. The parts running with the shaft 1 are a labyrinth ring 7 pushed onto the shaft 1 and an inner ring 8. Both parts 7 and 8 are secured in place by an end nut 9. Mounted on the opposite side of the rollers 6 from the labyrinth ring 7 is a support ring 11 with sliding surface 10. This support ring 11 is braced against the end nut 9 via a plate spring 14, and maintains a distance 12 from the end nut 9.

Rollers 6 rest on the inner ring 8 between the support ring 11 and the labyrinth ring 7.

Felt rings 15 and 16 situated on the labyrinth ring 7 and the support ring 11 provide the seal between the moving parts and the stationary elements.

The fixed, stationary parts in the housing are essentially a middle ring 18 with a spherical shaped surface 19, an outer ring 20 resting on this surface 19 and a spring-ring 22 positioned above the same.

Flanged at the middle ring 18 and connected via threaded bolts, which are not shown here, are a securing ring 24 and a counter lying ring 25 which partly engages with, but does not touch the labyrinth ring 7.

The outer ring 20 is held on both sides by ring-shaped spring components 26 which are braced with rubber pieces 27 and intermediate ring-shaped discs 29 on the one hand against the housing 3, on the other hand against a sidewall ring 28 connected to the housing 3.

Both the securing ring 24 and its counterpart 25 form, along with the sidewall ring 28 or shortened housing part 30, ring-shaped openings 31 each of which is covered by a membrane 32.

The middle ring 18 can move with respect to the outer ring 20, the play for movement being limited by pins 35 projecting out of the surface 19 into holes 34 in the outer ring 20. The inner diamter $d_1$ of the holes 34 is larger than the diameter d of the pins 35. The difference between these diameters determines the amount of play available between the middle ring 18 and the outer ring 20.

The spring-ring 22 is comprised of two shells 36 and 37 and features at each of the veritical poles of the wheel bearing R further, intermediate rubber pieces 38.

What is claimed is:

1. Bearing device for wheel set axle shafts having enclosed in an axle bearing housing a wheel bearing comprising an inner ring fitted on the axle and an outer ring aligned with and around the inner ring with roller means between the said rings, and with the inner ring held securely in place by securing means wherein said securing means is a nut screwed onto the said axle shaft, said device including energy storage means comprising a plate spring which is braced against the end nut between the wheel bearing and the axle bearing housing in order to accommodate forces acting on the wheel bearing in the operating position.

2. Device according to claim 1 for the axle shafts of a railway car bogie.

3. Device according to claim 1 including a support ring having a shoulder which engages the inner ring and presents a sliding, bearing surface to the inner ring, wherein said plate spring is also braced against said support ring.

4. Device according to claim 3 including sealing means connected to said support ring.

5. Device according to claim 4 wherein said sealing means is a felt ring.

6. Bearing device for wheel set axle shafts having enclosed in an axle bearing housing a wheel bearing comprising an inner ring fitted on the axle and an outer ring aligned with and around the inner ring with roller means between the said rings, and with the inner ring held securely in place by securing means, said device including energy storage means between the wheel bearing and the axle bearing housing in order to accommodate forces acting on the wheel bearing in the operating position, wherein the outer ring running around the inner ring is in the form of a middle or intermediate ring, a second ring resting on said middle ring braced via said energy storage means against the axle bearing housing such that both said middle ring and said second ring can be moved with respect to each other over a limited range thus permitting a certain degree of tilt between the axle and the axle bearing housing.

7. Device according to claim 6 including a fixed sidewall ring bracing said outer ring.

8. Device according to calim 7 including a securing ring and counterlying ring positioning said middle ring therebetween, such that there is a ring-shaped opening between counterlying ring and said housing and another such opening between the sidewall ring and the securing ring, and membranes bridging over both said openings.

9. Device according to claim 8 including sealing means connected to said holding ring.

10. Device according to claim 6 wherein said middle ring includes a spherical shaped surface and wherein the second ring rests on said spherical shaped surface.

11. Device according to claim 10 including holes in the second ring and pins projecting out of said spherical shaped surface into said holes, the diameter ($d_1$) of the said holes being larger than the diameter (d) of the pins.

12. Bearing device for wheel set axle shafts having enclosed in an axle bearing housing a wheel bearing comprising an inner ring fitted on the axle and an outer ring aligned with and around the inner ring with roller means between the said rings, and with the inner ring held securely in place by securing means, said device including energy storage means between the wheel bearing and the axle bearing housing in order to accommodate forces acting on the wheel bearing in the operating position, and including a middle ring running around the inner ring and a spring ring resting on the middle ring in particular in order to accommodate vertical forces, the said spring ring comprising two shells with an energy storage means provided between them at least at the vertical poles of the wheel bearing.

13. Device according to claim 12 wherein the energy storage means comprises at least two strips of elastic material situated on both sides of the vertical pole.

14. Bearing device for wheel set axle shafts having enclosed in an axle bearing housing a wheel bearing comprising an inner ring fitted on the axle and an outer ring aligned with and around the inner ring with roller means between the said rings, and with the inner ring held securely in place by securing means, said device including energy storage means between the wheel bearing and the axle bearing housing in order to accommodate forces acting on the wheel bearing in the operating position, and including a spring ring resting on the outer ring, the said spring ring comprising two shells with an energy storage means provided between them at least at the vertical poles of the wheel bearing.

15. Device according to claim 14 wherein the energy storage means comprises at least two strips of elastic material situated on both sides of the vertical pole.

* * * * *

UNITED STATES PATENT AND TRADEMARK OFFICE
CERTIFICATE OF CORRECTION

PATENT NO. : 4,595,302
DATED : June 17, 1986
INVENTOR(S) : URS ATTINGER ET AL.

It is certified that error appears in the above-identified patent and that said Letters Patent are hereby corrected as shown below:

In Column 2, line 38, change "arragement" to read ---arrangement---.

In Column 2, line 41, change "fo" to read ---of---.

In Column 3, claim 1, line 51, after "means" insert ---,--- and delete "wherein said".

In Column 3, claim 1, line 52, delete line 52.

In Column 3, claim 1, line 53, after "means" insert ---wherein said securing means is a nut screwed onto the said axle shaft,---.

In Column 4, claim 8, line 19, change "calim" to read ---claim---.

Signed and Sealed this
Fourteenth Day of October, 1986

[SEAL]

Attest:

DONALD J. QUIGG

Attesting Officer

Commissioner of Patents and Trademarks